G. E. DOWLING & S. T. CONE.
RAFTING DOGS
117752
Patented Aug 8 1871
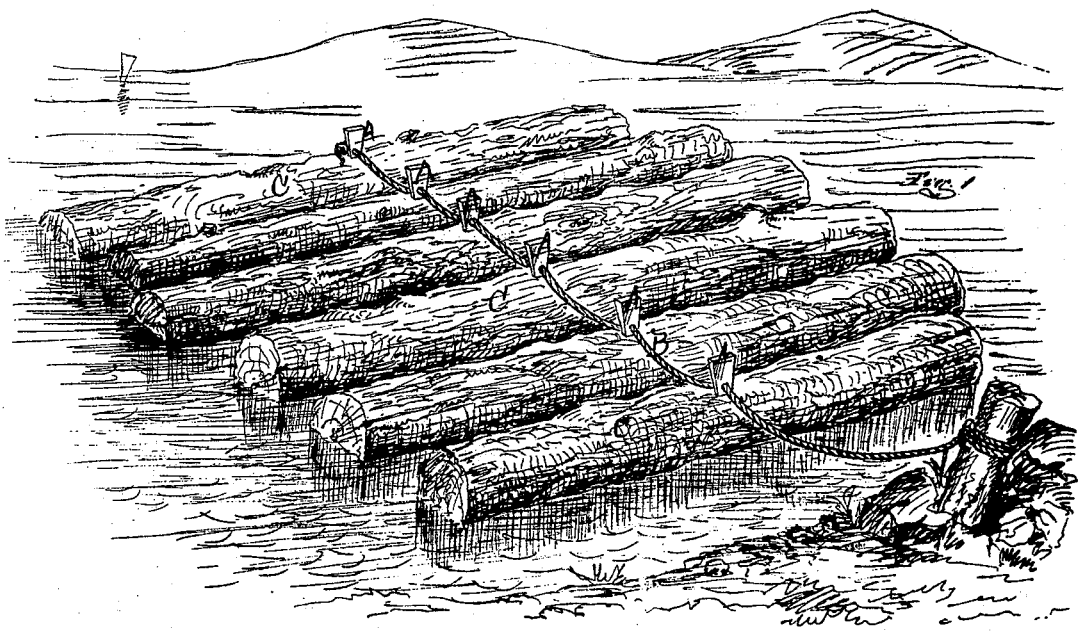
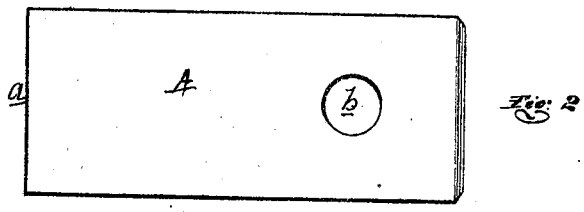
Attest
Seymour V. Church
Elihu Cox
Inventor
G. E. Dowling
S. T. Cone
per atty
Th. S. Sprague

UNITED STATES PATENT OFFICE.

GEORGE E. DOWLING AND SALMON F. CONE, OF MONTAGUE, MICHIGAN.

IMPROVEMENT IN RAFTING-DOGS.

Specification forming part of Letters Patent No. 117,752, dated August 8, 1871.

*To all whom it may concern:*

Be it known that we, GEORGE E. DOWLING and SALMON F. CONE, of Montague, in the county of Muskegon and State of Michigan, have invented a new and useful Improvement in Rafting-Dogs; and we do declare that the following is a true and accurate description thereof, reference being had to the accompanying drawing and to the letters of reference marked thereon, and being a part of this specification, in which—

Figure 1 is a perspective view of our rafting-dog in operation. Fig. 2 is a plan view of the rafting-dog.

In the accompanying drawing like letters designate like parts.

The nature of this invention relates to a rafting-dog or perforated pin for the purpose of rafting logs, timber, or other floatables, to be used with a rope or other suitable connection. The solid and substantial wedge-form of the dog makes it so strong that it is not easily broken, as is the case with the slotted dog which straddles the log, which is liable to split, and the prongs of the dog or pin are too weak to stand the lateral hammering necessary to free them from the log, and when they do come out, if not spoiled, they usually fly off the line into the water and are lost. This invention consists in the construction and operation of a wedge-shaped dog or pin with a hole through it at a suitable distance from the point and of a proper size to admit a rope or other convenient connection, with which it is to be used. When the dogs are to be used they may be driven into the logs and the rope passed through, or the dogs may be strung on the rope, and the dog being driven into the log until the upper edge of the hole binds the rope to the log, when the log will be retained in its relative position to the rest of the raft until the dog is detached from the log, which is done by striking on the side of the dog, which will turn it out of the log, and the dog will remain on the rope, so that it cannot be lost and is ready for use again, as is hereinafter more fully and substantially set forth.

In the accompanying drawing, A is a wedge-shaped dog, having a hole, $b$, through it at a suitable distance from the edge $a$. B is a rope or other suitable connection which passes through the hole $b$ and connects the log C to the rest of the raft.

In operation the dog A is driven into the log C until the upper edge of the hole $b$ binds the rope B to log C so that the log C is retained in its relative position with the rest of the raft.

What we claim as our invention, and desire to secure by Letters Patent, is—

The wedge-shaped dog A, having a hole, $b$, through it, in combination with a rope, C, or its equivalent, substantially as and for the purposes set forth.

GEORGE E. DOWLING.
SALMON F. CONE.

Witnesses:
D. C. BOWEN,
C. L. STRENY.